United States Patent Office 3,351,497
Patented Nov. 7, 1967

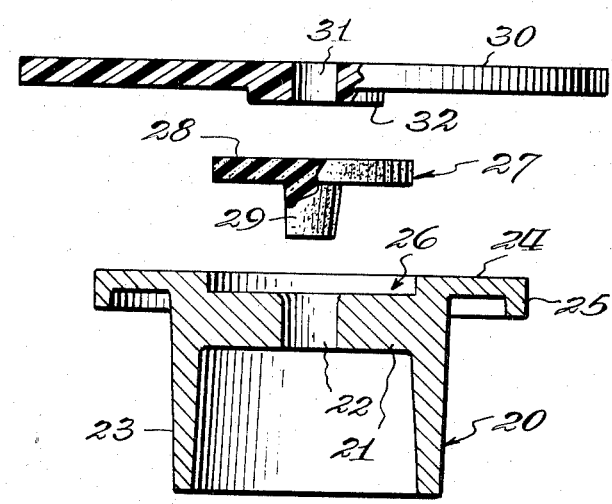
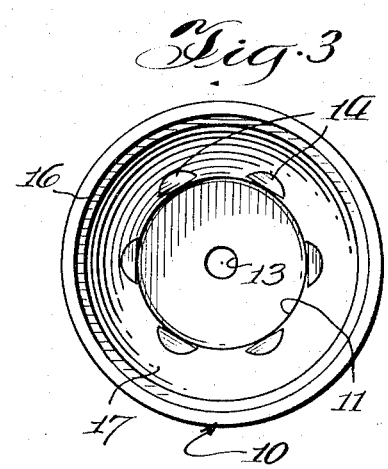
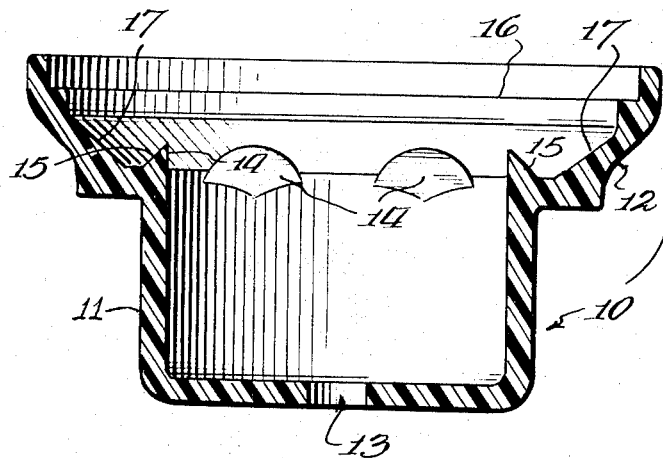
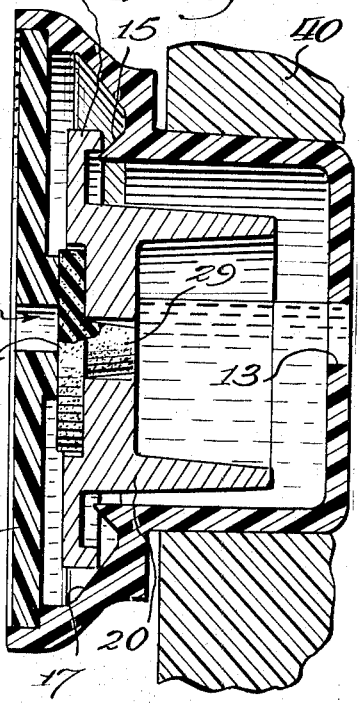
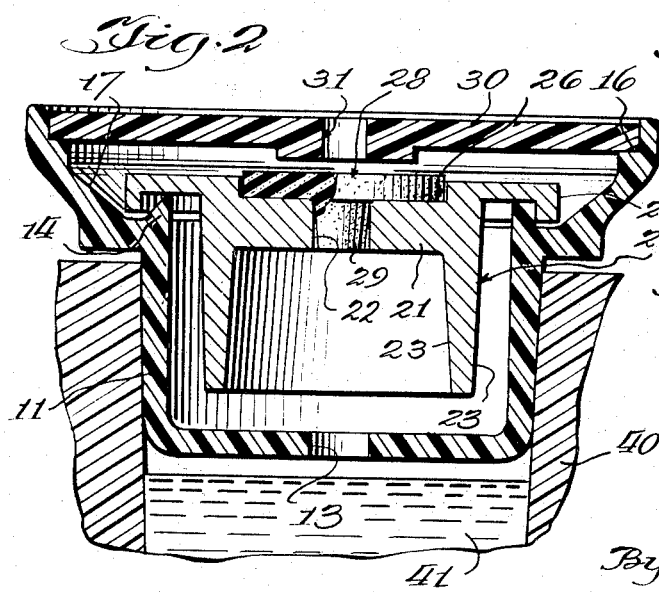

3,351,497
NON-SPILL VENT PLUG
Gordon B. Lucas, River Forest, Ill., assignor to The Richardson Company, Melrose Park, Ill., a corporation of Ohio
Filed Dec. 10, 1962, Ser. No. 243,519
4 Claims. (Cl. 136—178)

This invention relates to a new type of vent plug adaptable for preventing discharge of electrolyte from an electrical storage battery when the battery is tilted or otherwise moved from its normal operating position.

Storage batteries are composed of a plurality of individual cells containing acid electrolyte. In operation, the reaction occurring in each cell results in the formation of gas which must be discharged to the atmosphere. The electrolyte filling well located in the cover of each battery cell is customarily closed with a vent plug. Such plugs are usually in the form of hollow stoppers and generally contain some kind of internal baffle system which will permit egress through the plug of the gases produced in the cell while offering obstruction to discharge of electrolyte, which may tend to occur upon sudden movement or jarring of the battery.

However, under certain extreme conditions, batteries may be tilted to the side or otherwise moved from a normally horizontal position to the extent that the electrolyte flows into the vent plug and may be discharged therefrom by passing around the baffle system provided.

Accordingly, one of the prime objects of the present invention is to provide a vent plug which will permit the normal egress of gases by means of vent openings, but which will include a valve mechanism whereby at least the outermost opening is sealed off whenever the battery is placed in an abnormal position which would permit the electrolyte to run out through the vent openings.

Another object is to provide a vent plug of the foregoing type which is relatively inexpensive, may be readily assembled and is capable of being produced under mass production techniques.

These and other objects will become more apparent from the drawings and specification set forth in more detail hereinafter.

In the drawings:

FIGURE 1 is an exploded view, in elevation and partly in cross section, of the components of the present vent plug.

FIGURE 2 is a fragmentary elevation, partly in cross section, of the assembled vent plug installed within the filling well of a battery.

FIGURE 3 is a plan view of the base or cup portion of the vent plug.

FIGURE 4 is a view, partly in cross section, of the vent plug installed in a filling well of a battery, illustrating the manner in which the valve, contained within the plug, operates to close the outermost vent opening when the battery is tilted on its side.

Turning now to the drawings for a more detailed description of the invention, and particularly to FIGURE 1, the numeral 10 designates the hollow cup-like base of the vent plug. The base 10 comprises a lower cylindrical section 11 and an enlarged outwardly flared annular top section 12. In the vent plug shown in the drawings the exterior of section 11 is indicated as being smooth and, accordingly, when inserted in a filling well it is intended to be retained by a friction fit. However, as an alternate, section 11 and the inner surface of a filling well could be provided with complementary threads.

Section 11 is provided with a bottom opening 13 of relatively small diameter, which is adapted to permit communication between the interior of the vent plug and the battery cell. Disposed around the internal periphery of the base 10, substantially at the juncture of the lower section 11 and top section 12, are a plurality of circumferentially spaced supports or bosses 14 which are formed integral with the base 10. Each of the bosses project upwardly, as shown in FIGURE 1, and is provided with downwardly and outwardly sloping outer faces or sides 15 whose function will be further described hereinafter.

The enlarged annular top section 12 is provided with an inwardly extending circumferential ledge 16 adapted to support a cap for the vent plug. The inner sides 17 of section 12 are designed so as to slope outwardly and upwardly from the juncture of the lower section 11 to a point immediately below ledge 16. The slope of the sides 17 is intended to permit and assist movement of the vent plug valve described below.

Adapted to be disposed within the base 10 is a valve, designated generally by the number 20. Preferably, the valve is composed of a relatively heavy material resistant to battery electrolyte. A typical material found suitable is lead which, as is well known, is not corroded by battery acid and has a relatively high density.

The valve 20 includes a base 21 provided with a vertically extending opening 22, whose function will be referred to further. Depending from base 21 is a cylindrical skirt 23. Extending laterally from the base 21 is a circumferential shoulder 24 provided with a peripherally depending flange 25. It will also be noted that the design of the valve is such that shoulder 24 forms with the base 21 a centrally located recess 26 connected with opening 22.

Recess 26 and opening 22 are adapted to receive what may be referred to as a resilient insert 27 formed, preferably, of a material such as rubber which, also, should be resistant to battery electrolyte. Insert 27 consists of a disc 28 having substantially the same dimensions as recess 26 and a depending stem 29 adapted to fit firmly into opening 22 of valve 20.

The top of the vent plug consists of cap 30 provided with an opening 31, which provides the outer vent opening of the vent plug. That portion of the underside of the cap 30 immediately surrounding opening 31, namely, portion 32, is slightly enlarged so as to permit a more positive closure when valve 20 and insert 27 are forced against the underside of cap 30 as hereinafter described.

Base 10 and cap 30 may be formed by molding a suitable corrosion resistant plastic material and, particularly, thermoplastic materials such as polystyrene, polyethylene, nylon or the like. However, as indicated, valve 20 is preferably made from lead and the insert 27 formed of a resilient rubber material or some other composition having similar characteristics.

In assembling the vent plug, insert 27 is installed within recess 26 of valve 20. This may be accomplished by reason of a press fit between stem 29 of insert 27 and opening 22 of valve 20. Alternately, a suitable adhesive may be applied to the bottom of recess 26 and underside of disc 28. After the valve and insert have been united, the assembly is installed within the base 10 of the vent plug. As perhaps best illustrated in FIGURE 2, the underside of shoulder 24 is adapted to rest on and be supported by the upper edge of bosses 14, with the main part of the valve being suspended within the cylindrical lower section 11 of the cup-like base 10 of the vent plug.

After installation of the valve, cap 30 is then positioned within the enlarged annular top section 12 and is adapted to be supported therein by ledge 16. Generally, some suitable adhesive will be applied on ledge 16 to permanently retain cap 30 in position on the base 10.

As indicated in the drawing, when the valve is in normal position and supported on the bosses, it divides the vent plug into two compartments. Communication between compartments is provided by means of the openings between the circumferentially spaced bosses.

When the assembled vent plug is inserted into a filling well 40 of a battery cell, as shown in FIGURE 2, it is adapted to close the well to inadvertent discharge of electrolyte but permit egress of gases formed in the cell. Thus, gases evolved from the electrolyte 41 as a result of chemical reactions occurring in the cell will initially enter the vent plug through bottom opening 13. Upon entering the lower section 11 of the vent plug the evolved gases pass up and around the outside of skirt 23 of the valve and then between the bosses 14. Once the gases have passed between the bosses, they will continue over the top of the valve 20 and be discharged through top opening 31 in cap 30.

In the normal operating position of the battery the presence of the vent plug within the filling well 40 will, as indicated, prevent discharge of electrolyte from the filling well through the vent plug even in the advent of some jostling or jarring of the battery. Thus, it will be seen that should electrolyte enter opening 13 in the vent plug, the depending skirt 23 of valve 20 in combination with shoulder 24 serves to provide substantial obstruction to the passage of the electrolyte upward to reach opening 31 in the top of the vent plug. As described above, little, if any, obstruction is presented to the passage of gases created and they may readily flow upwardly and outwardly through opening 31. However, as previously indicated, there are times when some batteries in certain types of vehicles, particularly aircraft, etc., may be tilted to the extent that electrolyte would completely fill the vent plug. In such a case and in the absence of a means to seal off at least opening 31, the electrolyte could be discharged from the vent plug and undoubtedly result in damage, corrosion, etc. to areas or articles surrounding or in the vicinity of the battery.

FIGURE 4 illustrates the operation of the present valve within the vent plug to seal off discharge of electrolyte through the vent plug when a battery is tilted on its side or is otherwise disposed in an abnormal position. As shown in FIGURE 4, in the foregoing situation, the relatively heavy valve 20 is permitted to move toward opening 31 due to the action of gravity on the valve mass. By reason of the relatively heavy weight of valve 20 it forces the resilient insert 27 against the underside of cap 30, firmly closing opening 31 and thus preventing discharge of electrolyte. When the battery is tilted back into its normal position the valve body will likewise return to its normal position, as shown in FIGURE 2.

The foregoing action of valve 20 is obtained by reason of the design of bosses 14 and the internal slope of sides 17 of the annular section 12, in combination with the flange 25 of shoulder 24. Thus, in the normal position of the battery, valve 20 is supported by the upper edges of the bosses 14. However, when the battery is tilted, as shown in FIGURE 4, the outer inclined face of bosses 14 and the slope of sides 17 readily permit the flange 25 to ride upwardly along the outer face of the bosses and sides 17, thereby enabling the valve to move toward the underside of cap 30. Conversely, when the battery is returned to its normal position the valve easily slides back into its normal position.

Having described the invention and certain exemplary embodiments, the same is only intended to be limited by the scope of the following claims.

I claim:
1. A battery cell vent plug comprising a hollow cup-like base composed of a cylindrical, closed-end lower section with a vent opening in the bottom thereof and an integral outwardly flared annular upper section provided with a ledge extending around its inner periphery, a plurality of circumferentially spaced upwardly extending bosses disposed around the internal wall of said base at substantially the juncture of said sections, the outer side of said bosses extending downwardly and outwardly, a cap provided with a vent opening supported by said ledge; and a valve of relatively heavy mass disposed within the vent plug having a circumferential shoulder provided with a downwardly extending peripheral flange, said valve being supported by said shoulder on said bosses in a position intermediate of the cap and the bottom of the base with said peripheral flange being disposed around the outer sides of said bosses whereby the interior of said plug is divided into two connecting compartments, said valve being capable of movement toward the underside of the cap to close its vent opening when the vent plug is partially or wholly inverted.

2. A battery cell vent plug as described in claim 1 wherein said valve is provided with a cylindrical skirt depending from the underside thereof extending downwardly into the closed-end lower section of the cup-like base and in spaced relationship with respect to the walls and bottom thereof.

3. A battery cell vent plug as described in claim 1 wherein said valve is composed of lead.

4. A battery cell vent plug as described in claim 3 wherein said valve is provided with a resilient rubber section centrally disposed on its upper surface and having an area larger than the area of the vent opening in said cap.

References Cited
UNITED STATES PATENTS

| | | | |
|---|---|---|---|
| 1,301,993 | 4/1919 | Angell | 136—178 |
| 2,315,431 | 3/1943 | King et al. | 136—178 |
| 2,682,569 | 6/1954 | Duncan | 136—178 |

WINSTON A. DOUGLAS, *Primary Examiner.*

JOHN H. MACK, *Examiner.*

D. L. WALTON, *Assistant Examiner.*